United States Patent
Haka

(10) Patent No.: US 7,011,596 B2
(45) Date of Patent: Mar. 14, 2006

(54) TRANSFER CASE

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 19 days.

(21) Appl. No.: 10/738,566

(22) Filed: Dec. 17, 2003

(65) Prior Publication Data

US 2004/0180752 A1    Sep. 16, 2004

Related U.S. Application Data

(60) Provisional application No. 60/454,518, filed on Mar. 13, 2003.

(51) Int. Cl.
*F16H 3/44* (2006.01)

(52) U.S. Cl. .................................................. 475/285

(58) Field of Classification Search ............ 475/284, 475/285, 303
See application file for complete search history.

(56) References Cited

U.S. PATENT DOCUMENTS

| | | | |
|---|---|---|---|
| 4,349,091 A | 9/1982 | Miyake et al. ............ 192/53 F |
| 4,468,982 A * | 9/1984 | Fujita ............................ 475/71 |
| 4,747,323 A * | 5/1988 | Kiuchi et al. .................. 475/59 |
| 5,046,999 A * | 9/1991 | Liu et al. ...................... 475/281 |
| 5,194,056 A * | 3/1993 | Schiffhauer ................... 475/325 |
| 6,364,804 B1 * | 4/2002 | Haka ............................ 475/278 |
| 6,746,357 B1 * | 6/2004 | Usoro et al. .................. 475/275 |

* cited by examiner

*Primary Examiner*—Dirk Wright
(74) *Attorney, Agent, or Firm*—Christopher DeVries

(57) ABSTRACT

A compound planetary gear arrangement for a transfer case includes a ring gear in driving engagement with an output shaft. A sun gear and carrier are selectively alternatively connectable with a transmission housing (ground) through a clutch or selectively connectable with an input through a clutch. This compound planetary gear arrangement provides one direct and two underdrive ratios between the input and the output of the transfer case.

10 Claims, 2 Drawing Sheets

TRANSFER CASE

CROSS-REFERENCE TO RELATED APPLICATION

This application claims the benefit of U.S. Provisional Application 60/454,518 filed Mar. 13, 2003, which is hereby incorporated by reference in its entirety.

TECHNICAL FIELD

The invention relates to a two-speed and a three-speed transfer case which provide an under drive ratio of approximately 1.5:1.

BACKGROUND OF THE INVENTION

Four-wheel drive (4WD) vehicles provide traction which is often unattainable in two-wheel drive (2WD) vehicles by delivering power to both of the vehicle's axles. Attendant with the added traction provided by four-wheel drive is the added complexity of the drive train required to control and deliver power to all four wheels as opposed to only two wheels. Four-wheel drive characteristically does not have a center differential which would maintain a fixed fraction of torque delivered to each axle, but rather maintains the same speed at each axle regardless of the torque split. The delivery of power between the front wheels and the rear wheels of the vehicle is typically handled by a transfer case mechanism which usually includes either a mechanically or electronically controlled clutch to switch between rear-wheel drive and four-wheel drive.

In all-wheel drive (AWD) systems, the front and rear axles are continually in driving engagement with the transfer case, but the system contains a center differential to maintain a fixed ratio of torque between the front and rear axle.

In addition to controlling the transfer of torque between front and rear axles of a vehicle, the transfer case may also include a planetary gear set or set of countershaft gears which provides an underdrive or overdrive ratio. Further, rather than manufacturing a new five- or six-speed transmission, an existing four-speed transmission may be used with a transfer case to provide additional speed ratios, such as for stump pulling (extreme underdrive), or in a top gear-overdrive condition.

SUMMARY OF THE INVENTION

One aspect of the invention provides a two-speed transfer case having an underdrive ratio of approximately 1.5:1 in order to provide a more utilitarian "tow haul" mode for use on public roads. This transfer case uses a planetary gear set with a ring gear and carrier which are selectively connectable to the input, and a grounded sung gear. The carrier is continuously connected to the output. The grounded sun gear and ring gear/sun gear tooth ratio provide the underdrive ratio, and the direct coupling of the input to the carrier provides a direct 1:1 ratio.

Another aspect of the invention provides a three-speed transfer case with a single compound planetary gear set. The three-speed transfer case provides direct drive, underdrive, and extreme underdrive ratios between the input and output of the transfer case. The ring gear is connected with the output, with the sun gear and carrier switching from input to ground depending upon the desired underdrive ratio. Direct drive is achieved by inputting torque to both the sun gear and carrier, or coupling the input to the output.

More specifically, this aspect of the invention provides a transfer case including an input shaft, an output shaft, and a compound planetary gear set including a ring gear, a carrier and a sun gear. The sun gear and carrier are selectively alternatively connectable with ground through a first clutching arrangement or selectively connectable with the input shaft through a second clutching arrangement. The first and second clutching arrangements are selectively engageable to provide one direct drive ratio and two underdrive ratios between the input shaft and the output shaft of the transfer case.

The first and second clutching arrangements may be dog clutches and synchronizers.

The first clutching arrangement may be adjustable for selectively grounding the sun gear, grounding the carrier, or disconnecting the sun gear and carrier from ground. The second clutching arrangement may be selectively adjustable for connecting the input shaft to the carrier, connecting the input shaft to the carrier and the sun gear, connecting the input shaft to the sun gear, or disconnecting the input shaft from the planetary gear set.

Alternatively, the first clutching arrangement may include a first one-way clutch and a first friction clutch connected in parallel between the sun gear and ground, and a second one-way clutch and a second friction clutch connected in parallel between the carrier and ground. The second clutching arrangement may include a primary clutch for connecting the sun gear with the input shaft, and a secondary clutch for connecting the carrier with the input shaft.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
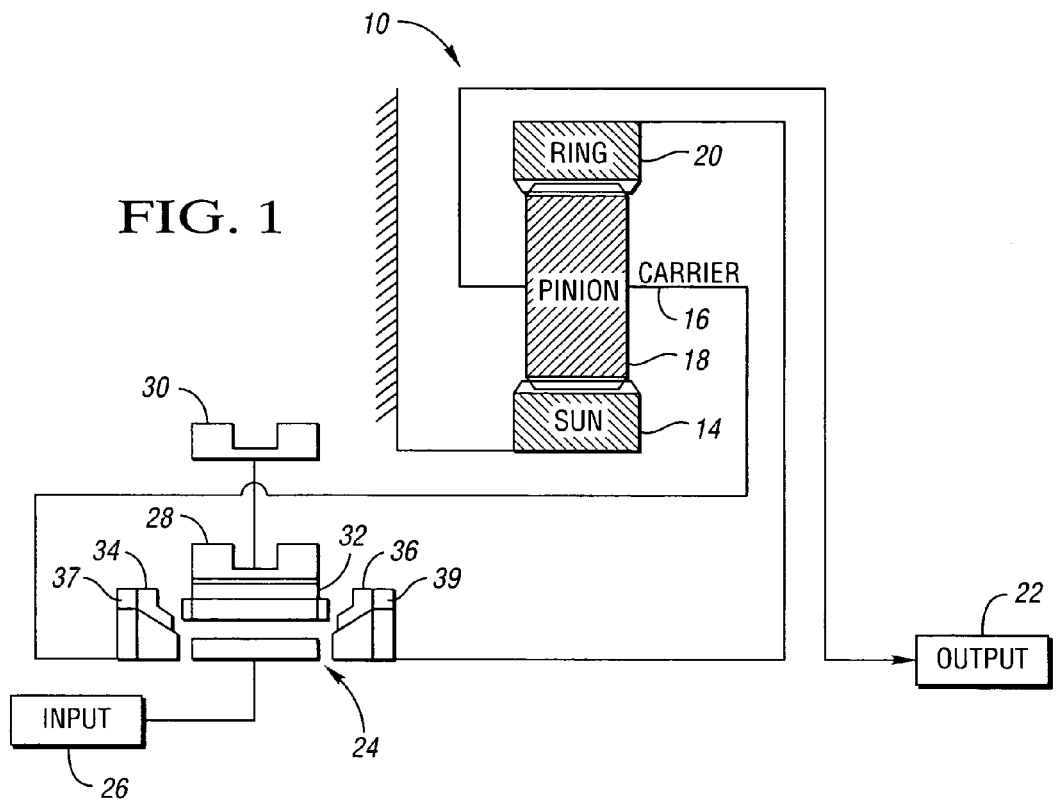
FIG. 1 shows a schematic illustration of a two-speed transfer case with a dog clutch in accordance with the invention.

Referring to FIG. 1, a schematic is shown illustrating a two-speed transfer case 10 in accordance with a first aspect of the invention. As shown, the two-speed transfer case 10 includes a simple planetary gear set 12 including a sun gear 14, a carrier 16 which supports pinions 18, and a ring gear 20.

The sun gear 14 is grounded as shown, and the carrier 16 is continuously connected with the output 22 for driving the rear axle.

A dog clutch 24 is provided for alternately connecting the input 26 from the transmission to the ring gear 20 or the carrier 16. One skilled in the art will recognize that the direct drive ratio can be achieved by connecting the input to the output, or connecting any two elements of the planetary gear set together and disconnecting the ground.

The dog clutch 24 is a conventional dog clutch used in manual transmissions, and includes inner and outer rings 28, 30, a sliding clutch member 32, and can be configured with or without blocker rings 34, 36 which are engaged when the sliding clutch member 32 slides back and forth to contact the blocker rings 34,36. When the sliding clutch member 32 bypasses the respective blocker ring after speeds are synchronized, the sliding clutch member 32 engages the respective member 37, 39 for transmitting torque to the ring gear 20 or carrier 16. By way of example, dog clutches which may be used with the present invention are shown in U.S. Pat. No. 4,349,091, which is hereby incorporated by reference in its entirety. Specifically, FIG. 10 of the '091 patent shows a dual dog clutch which could be used herein.

When the carrier 16 is engaged with the clutch member 32, the input 26 is directly connected through the carrier 16 to the output 22 to provide a 1:1 ratio. When the ring gear 20 is connected with the clutch member 32, the input 26 is connected to the ring gear 20, and an underdrive ratio is provided through the carrier 16 to the output 22 because the sun gear 14 is grounded. By way of example, the underdrive ratio will be 1.45:1 when the planetary gear set has a ring gear to sun gear tooth ratio of 2.22:1.

The transmission to which the transfer case 10 is connected may only be shifted when the vehicle is stopped. However, the dog clutch 24 allows the transmission park and reverse to function normally.

This aspect of the invention provides a significant, improved "tow haul" mode that would both change the combined drive ratio and the shift schedule when the vehicle is at maximum gross vehicle weight. The invention may also provide a fuel economy advantage by not having to compromise the direct mode N/V ratios for maximum gross vehicle weight performance because the range of available ratios is significantly increased.

This transfer case gear arrangement contains an underdrive ratio and therefore creates more torque than the output of a base transmission to which it attaches, and will require torque carrying components that are slightly larger (higher torque capacity) than the transmission.

As an alternative, the invention also contemplates a two-speed transfer case with dynamic shifting. In this instance, the input is connected to the ring gear, the output is connected to the carrier, the direct clutch connects the sun gear to the input for a 1:1 torque ratio, and the underdrive clutch connects the sun gear to ground for an underdrive ratio. The direct clutch is a plate clutch (a rotating friction clutch), and the underdrive clutch is a combination one-way clutch and dog clutch arranged in parallel. The dog clutch is connected in park and reverse, and open in neutral and all forward gears. The dog clutch is activated by a mechanical link connected to the PRNDL cable (which is activated by the driver's hand when shifting). The friction clutch could be applied by line pressure from the transmission directed to a solenoid in the transfer case. The solenoid returns excess fluid to the transmission during clutch release, so a return line to the transmission sump is necessary. A rotating piston in the friction clutch would create a potential for the clutch apply pressure to mix in with the transfer case fluid. Both fluids would need to be ATF for clutch characteristics, but it would now be necessary to pump the leakage back into the transmission. The fluid transfer problem could be eliminated by using a stationary piston acting through a set of bearings.

This clutch arrangement allows the dynamic shift to be made from a one-way clutch to a plate clutch, and the dog clutch allows transmission reverse and park to function normally. The advantage of this system is in providing one more forward gear ratio, or two more forward gear ratios if the transfer case is shifted to direct to add an extra gear ratio between first and second, which will cause a double transition shift from first direct to second underdrive.

An existing four-speed transmission may be mated to a transfer case as described to provide a five- or six-speed automatic transmission. In this situation, the final drive ratio will need to be reduced 5% to 15% to obtain the optimum N/V (engine speed/vehicle speed) ratios for a 6:1 overall ratio powertrain.

Figure 2:
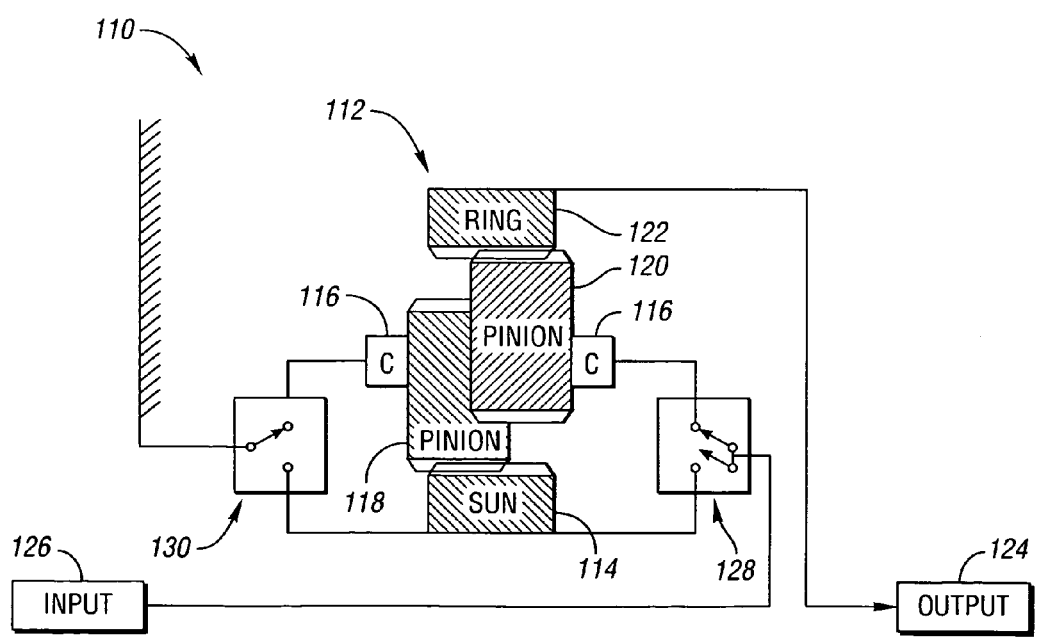
FIG. 2 shows a schematic illustration of a three-speed transfer case in accordance with an alternative embodiment of the invention.
Figure 3:
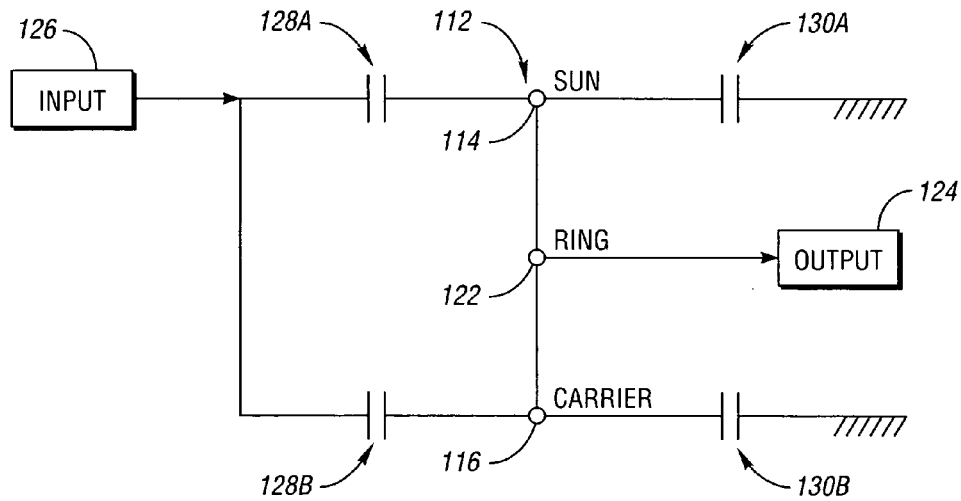
FIG. 3 shows a lever diagram corresponding with the schematic of FIG. 2.

Turning to FIGS. 2 and 3, an alternative three-speed transfer case 110 is shown in accordance with a further aspect of the invention. As shown, the transfer case 110 includes a compound planetary gear set 112 including a sun gear 114, a carrier 116 which supports pinions 118, 120, and a ring gear 122.

The ring gear 122 is continuously connected with the output (or output shaft) 124 for driving a rear axle. The input (or input shaft) 126 from the transmission may be alternately connected with the sun gear 114 and/or carrier 116 through the dual dog clutch 128. The dual dog clutch 128 has four selectable positions: (1) connecting the input to the carrier 116; (2) connecting the input to the carrier 116 and sun gear 114; (3) connecting the input to the sun gear 114; or (4) disconnecting the input. The dual dog clutch 128 may be embodied as two single dog clutches back to back with synchronizers, such as those used in a conventional manual transmission for 1–2 or 3–4 shifting. By way of example, dog clutches which may be used with the present invention are shown in U.S. Pat. No. 4,349,091, which is incorporated by reference above. Specifically, FIG. 10 of the '091 patent shows a dual dog clutch which could be used herein.

The dog clutch 130 is also a dual dog clutch which may connect the ground (i.e., the transmission housing) to the sun gear 114, the carrier 116, or to nothing.

Assuming that the ring gear to sun gear tooth ratio is less than 2.00 for the ring gear 122 and sun gear 114, the following conditions apply for achieving the two underdrive ratios and direct drive ratio with the structure of FIG. 2. When the input 126 is connected to the carrier 116 through the dog clutch/synchronizer 128, and the sun gear 114 is grounded through the dog clutch/synchronizer 130, a maximum underdrive ratio is achieved (such as 3:1). The torque ratio is then equal to (R/S)/(R/S-1) where R/S is equal to the ring gear/sun gear tooth ratio for the ring gear 122 and sun gear 114.

A normal or mid underdrive ratio (such as 1.5:1) is achieved in FIG. 2 by connecting the input 126 to the sun gear 114 through the dog clutch/synchronizer 128, and connecting the carrier 116 to ground through the dog clutch/synchronizer 130. The torque ratio would then equal the ring gear/sun gear tooth ratio for the ring gear 122 and sun gear 114.

To achieve a direct drive ratio (i.e., 1:1), the dog clutch/synchronizer 128 connects the input 126 to both the sun gear 114 and the carrier 116, and the dog clutch/synchronizer 130 is open (i.e., neither the sun gear 114 nor carrier 116 are grounded). The result is a direct drive ratio with a torque ratio equal to 1.

In the above description, if the ring gear/sun gear tooth ratio is greater than 2.00, then the algebra governing the magnitude of the gear ratios is unchanged, but the conditions described above for achieving underdrive and maximum underdrive are reversed.

The shifts described above are non-dynamic shifts (i.e., no torque is present during the shift).

As shown in FIG. 2, this gear arrangement requires a compound gear set to allow the switching of both the input 126 and ground elements while maintaining a constant ring gear output 124. The available ratios are direct, approximately 1.5:1 underdrive, and approximately 3.0:1 underdrive. Exact ratios will be determined by the planetary gear set ring gear to sun gear tooth ratio. This gives the driver the advantage of two underdrive ratios. The 1.5:1 ratio will provide an improved "tow haul" mode for use "on the road," while the 3:1 ratio provides the ability to crawl over rocks or pull stumps "off road." The dog clutches 128, 130 allow the transmission reverse and park to function normally.

The first clutch 130 may be a dual dog clutch or two friction clutches. Also, the second clutch 128 may be a dual dog clutch or two friction clutches.

FIG. 3 shows a lever diagram corresponding with the schematic of FIG. 2 wherein the first clutching arrangement 128 shown in FIG. 2 is embodied as first and second dog clutches 128A and 128B. Like reference numbers are used to identify like components in FIGS. 2 and 3.

In the configuration of FIG. 3, with the ring gear to sun gear tooth ratio being less than 2.00 for the ring gear 122 and sun gear 114, maximum underdrive, underdrive and direct drive may be achieved under the conditions described below.

With the clutch 128B connecting the input 126 with the carrier 116, and the clutch 130A connecting the sun gear 114 to ground, a maximum underdrive (3:1) condition is achieved. In this condition, the torque ratio is equal to (R/S)/(R/S-1), wherein R/S is the ring gear/sun gear tooth ratio for the ring gear 122 and sun gear 114.

With the clutch 128A connecting the input 126 to the sun gear 114, and the clutch 130B connecting the carrier 116 to ground, a mid underdrive ratio (1.5:1) is achieved. The torque ratio is equal to (R/S), wherein R/S is the ring gear/sun gear tooth ratio for the ring gear 122 and sun gear 114.

With the clutches 128A and 128B connecting the input 126 to both the sun gear 114 and carrier 116, and the clutches 130A and 130B open (neither the sun 114 nor carrier 116 being connected to ground), a direct drive ratio (1:1) is achieved wherein the torque ratio between the input 126 and the output 124 equals 1.

For the description of the maximum underdrive, mid underdrive and direct drive ratios above with respect to FIG. 3, if the ring gear/sun gear tooth ratio for the ring gear 122 and sun gear 114 is greater than 2.00, the algebra governing the magnitude of the torque ratio is unchanged, but the criteria for obtaining the maximum underdrive and underdrive conditions described above are reversed.

Figure 4:
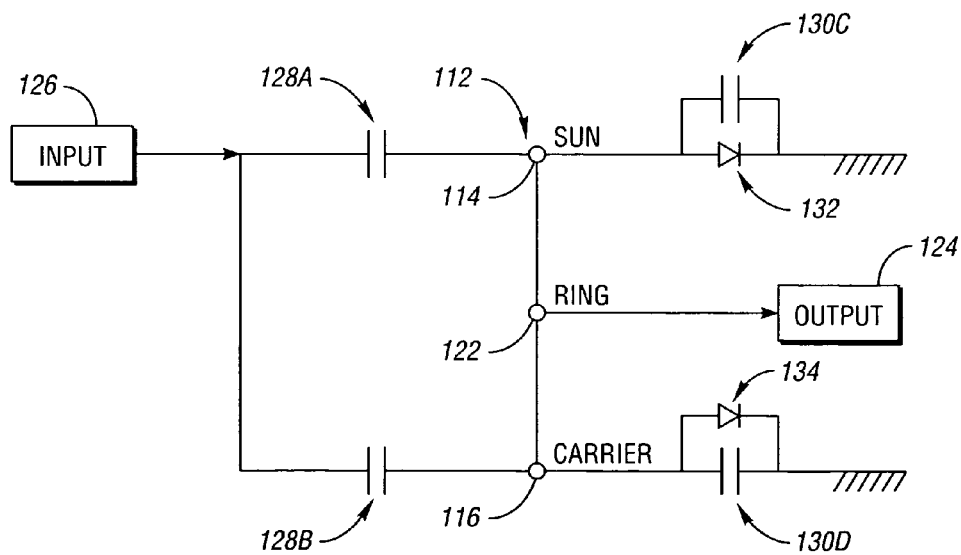
FIG. 4 shows a lever diagram of a three-speed transfer case corresponding with an alternative arrangement for the schematic of FIG. 2.

Turning to FIG. 4, a lever diagram of a three-speed transfer case is shown corresponding with an alternative arrangement for the schematic of FIG. 2, wherein like reference numerals refer to like components from FIGS. 2 and 3. In this configuration, the input 126 is connectable to the sun gear 114 through the clutch 128A, and connectable to the carrier 116 through the clutch 128B. The sun gear 114 is connectable to ground through the dog clutch 130C and one-way clutch 132, which are connected in parallel. The carrier 116 is connectable to ground through the dog clutch 130D and one-way clutch 134, which are connected in parallel.

In this configuration, shifting from direct drive to the mid underdrive would be a dynamic shift. Shifting from a maximum underdrive to mid underdrive may also be a dynamic shift if desired.

With the ring gear to sun gear ratio for the ring gear 122 and sun gear 114 being less than 2.00, the following conditions apply for achieving maximum underdrive, mid underdrive and direct drive ratios.

With the clutch 128B connecting the input 126 to the carrier 116, and the clutch 130C connecting the sun gear 114 to ground, the maximum underdrive ratio is achieved. The torque ratio for maximum underdrive is equal to (R/S)/(R/S-1), wherein R/S is the ring gear/sun gear tooth ratio for the ring gear 122 and the sun gear 114.

With the clutch 128A connecting the input 126 to the sun gear 114, and the clutch 130D connecting the carrier 116 to ground, a medium (or mid) underdrive ratio is achieved. The torque ratio for the medium underdrive is equal to (R/S), wherein R/S is equal to the ring gear/sun gear tooth ratio for the ring gear 122 and sun gear 114 of FIG. 4.

With the clutches 128A and 128B connecting the input 126 to the sun gear 114 and carrier 116, respectively, and neither the sun gear 114 nor the carrier 116 grounded, a direct drive ratio is achieved. In direct drive, the torque ratio between the input 126 and output 124 is equal to 1.

If the ring gear to sun gear tooth ratio for the ring gear 122 and sun gear 114 is greater than 2.00, then the algebra governing the ratios is the same, but the above-described conditions for maximum underdrive and medium underdrive are reversed.

While the best modes for carrying out the invention have been described in detail, those familiar with the art to which this invention relates will recognize various alternative designs and embodiments for practicing the invention within the scope of the appended claims.

The invention claimed is:

1. A transfer case comprising:
   an input shaft and an output shaft;
   a compound planetary gear set including a ring gear, a carrier and a sun gear;
   said ring gear in driving engagement with the output shaft; and
   said sun gear and carrier being selectively alternatively connectable with ground through a first clutching arrangement, or selectively connectable with the input shaft through a second clutching arrangement;
   wherein said sun gear and said carrier are not simultaneously connectable with ground through said first clutching arrangement;
   wherein the first and second clutching arrangements are selectively engageable to provide one direct and two underdrive ratios between the input and the output shaft of the transfer case.

2. The transfer case of claim 1, wherein said first and second clutching arrangements comprise dog clutches.

3. The transfer case of claim 1, wherein said second clutching arrangement is selectively adjustable for connecting the input shaft to said carrier, connecting the input shaft to said carrier and said sun gear, connecting the input shaft to said sun gear, or disconnecting the input shaft from the planetary gear set.

4. The transfer case of claim 1, wherein said first clutching arrangement is adjustable for selectively grounding said sun gear, grounding said carrier, or disconnecting said sun gear and carrier from ground.

5. The transfer case of claim 1, further comprising a first one-way clutch connected between said sun gear and ground, and a second one-way clutch connected between said carrier and ground.

6. The transfer case of claim 1, wherein said second clutching arrangement comprises a primary clutch for connecting said sun gear with said input shaft, and a secondary clutch for connecting said carrier with said input shaft.

7. The transfer case of claim 1, wherein said first clutching arrangement comprises a first one-way clutch and a first dog clutch connected in parallel between said sun gear and ground, and a second one-way clutch and a second dog clutch connected in parallel between said carrier and ground.

8. The transfer case of claim 1, wherein said first clutching arrangement comprises a first one-way clutch and a first dog clutch connected in parallel between said sun gear and ground, and a second one-way clutch and a second dog clutch connected in parallel between said carrier and ground; and said second clutching arrangement comprises a primary clutch for connecting said sun gear with said input shaft, and a secondary clutch for connecting said carrier with said input shaft.

9. A transfer case comprising:

an input shaft and an output shaft;

a compound planetary gear set including a ring gear, a carrier and a sun gear;

said ring gear in driving engagement with the output shaft;

said sun gear and carrier being selectively alternatively connectable with ground through a first clutching arrangement, or selectively connectable with the input shaft through a second clutching arrangement;

wherein said sun gear and said carrier are not simultaneously connectable with ground through said first clutching arrangement;

wherein the first and second clutching arrangements are selectively engageable to provide one direct and two underdrive ratios between the input and the output shaft of the transfer case; and wherein said first and second clutching arrangements comprise dog clutches and synchronizers for non-dynamic shifting.

10. A transfer case comprising:

an input shaft and an output shaft;

a compound planetary gear set including a ring gear, a carrier and a sun gear;

said ring gear in driving engagement with the output shaft;

said sun gear and carrier being selectively alternatively connectable with ground through a first clutching arrangement, or selectively connectable with the input shaft through a second clutching arrangement;

wherein the first and second clutching arrangements are selectively engageable to provide one direct and two underdrive ratios between the input and the output shaft of the transfer case;

wherein said first clutching arrangement comprises a first one-way clutch and a first dog clutch connected in parallel between said sun gear and ground, and a second one-way clutch and a second dog clutch connected in parallel between said carrier and ground; and said second clutching arrangement comprises a primary clutch for connecting said sun gear with said input shaft, and a secondary clutch for connecting said carrier with said input shaft.

* * * * *